United States Patent
Sakata et al.

(10) Patent No.: US 12,503,569 B2
(45) Date of Patent: Dec. 23, 2025

(54) CARBON FIBER REINFORCED COMPOSITE MATERIAL

(71) Applicants: The University of Tokyo, Tokyo (JP); Akio Morimoto, Kobe (JP); Naoyuki Furusho, Nagano (JP)

(72) Inventors: Ichiro Sakata, Tokyo (JP); Bunshi Fugetsu, Tokyo (JP); Takayuki Ueki, Tokyo (JP); Akio Morimoto, Kobe (JP); Naoyuki Furusho, Kitaazumi-gun (JP)

(73) Assignees: The University of Tokyo, Tokyo (JP); Akio Morimoto, Kobe (JP); Naoyuki Furusho, Kitaazumi-gun (JP)

( * ) Notice: Subject to any disclaimer, the term of this patent is extended or adjusted under 35 U.S.C. 154(b) by 679 days.

(21) Appl. No.: 17/631,795

(22) PCT Filed: Jun. 23, 2020

(86) PCT No.: PCT/JP2020/024600
§ 371 (c)(1),
(2) Date: Jan. 31, 2022

(87) PCT Pub. No.: WO2021/033423
PCT Pub. Date: Feb. 25, 2021

(65) Prior Publication Data
US 2022/0315731 A1    Oct. 6, 2022

(30) Foreign Application Priority Data
Aug. 19, 2019  (JP) .................................. 2019-149960

(51) Int. Cl.
*C08K 3/04*   (2006.01)
*C08J 5/04*   (2006.01)
*B82Y 40/00*  (2011.01)

(52) U.S. Cl.
CPC .............. *C08K 3/042* (2017.05); *C08J 5/042* (2013.01); *B82Y 40/00* (2013.01); *C08J 2301/02* (2013.01); *C08J 2367/00* (2013.01); *C08K 2201/011* (2013.01)

(58) Field of Classification Search
CPC ...................................................... C08K 3/042
See application file for complete search history.

(56) References Cited

U.S. PATENT DOCUMENTS

| 2016/0177084 A1 * | 6/2016 | Hamada | C08L 63/10 523/447 |
| 2020/0270425 A1 | 8/2020 | Sakata | |

FOREIGN PATENT DOCUMENTS

| JP | 2017-110114 A | 6/2017 | |
| JP | 2017-119936 A | 7/2017 | |
| WO | WO-2017104609 A1 * | 6/2017 | ............. C01B 32/15 |

OTHER PUBLICATIONS

Chen et al., "Smart cellulose/graphene composites fabricated by in situ chemical reduction of graphene oxide for multiple sensing applications," Journal of Materials Chemistry A, 2018, 6, 7777-7785 (Year: 2018).*

L. Sun, et al.; "Mass production of graphene oxide from expanded graphite"; Materials Letters; Elsevier; 109; 2013; pp. 207-210 (4 pages).

* cited by examiner

*Primary Examiner* — Ian A Rummel
(74) *Attorney, Agent, or Firm* — Kratz, Quintos & Hanson, LLP

(57) ABSTRACT

A carbon fiber reinforced composite material includes carbon fiber and a thermosetting resin composition. The thermosetting resin composition is a cured product of a liquid composition that contains unsaturated polyester, a curing agent, a polymerization initiator, and a nanocarbon/nanocellulose complex containing nanocarbon modified by functional a group and nanocellulose. The nanocarbon/nanocellulose complex is dispersed in the thermosetting resin composition. The thermosetting resin composition contains 0.05 to 15% by weight of the nanocarbon/nanocellulose complex. A maximum point stress of the carbon fiber reinforced composite material in a tensile test according to JIS K 7164 is 410 N/mm$^2$ or more. A maximum point stress of the carbon fiber reinforced composite material in a three-point bending test according to JIS K 7171 is 310 N/mm$^2$ or more.

5 Claims, No Drawings

CARBON FIBER REINFORCED COMPOSITE MATERIAL

TECHNICAL FIELD

The present invention relates to a carbon fiber reinforced composite material.

BACKGROUND ART

A carbon fiber reinforced composite material having carbon fiber and matrix resin combined with each other has, for example, excellent strength, stiffness, and dimensional stability while having a light weight, and is thus used for sports goods, aircrafts, automobiles, and the like. However, it is known that, in this type of composite material, physical properties in the carbon fiber aligning direction and physical properties in the other directions are significantly different, impact resistance of the composite material depends on the interlaminar toughness between the carbon fiber and the matrix resin, and the low toughness of the matrix resin is likely to cause breakage due to stress applied from a direction other than the carbon fiber aligning direction. In a case where the breakage is thus caused, the matrix resin may be scattered and the fragments thereof may cause secondary damage.

As measures for improving this, it is suggested that a carbon fiber reinforced composite material is produced by using sizing-agent-applied carbon fiber that has excellent interfacial adhesiveness between the carbon fiber and matrix resin and that allows the carbon fiber reinforced composite material to exhibit high toughness (Patent Literature 1).

Furthermore, a nanocarbon complex containing nanocarbon and nanocellulose that is modified by a functional group is suggested in order to obtain an effect of stably and uniformly increasing mechanical strength of a carbon fiber reinforced composite material (Patent Literature 2).

CITATION LIST

Patent Literature

[PTL 1] Japanese Unexamined Patent Application Publication No. 2017-119936
[PTL 2] Japanese Unexamined Patent Application Publication No. 2017-110114

SUMMARY OF THE INVENTION

Problems to be Solved by the Invention

Here, the invention disclosed in Patent Literature 1 uses carbon fiber to which a sizing agent that contains nanocellulose having the number-average fiber diameter of 1 to 1000 nm and an epoxy-group-containing compound is applied, and requires pretreatment for the carbon fiber in order to secure the sizing agent to the carbon fiber. Such a treatment may reduce strength of the carbon fiber. Furthermore, production cost is increased due to such a treatment step being required. Patent Literature 2 discloses a carbon nanotube complex containing carbon nanotube and nanocellulose that is modified by a functional group. However, Patent Literature 2 does not indicate that a composite material is produced by using the carbon nanotube complex.

In view of the above, an object of the present invention is to provide a carbon fiber reinforced composite material having excellent mechanical properties at low cost.

Solution to the Problems

The inventors of the present invention have performed thorough studies for solving the above-described problem. As a result, the inventors have found that a carbon fiber reinforced composite material having excellent mechanical properties is easily obtained by using a complex of nanocellulose and nanocarbon, in particular, graphene oxide, in combination with a predetermined thermosetting resin, to complete the present invention. The summary of the present invention is as follows.

(1) A carbon fiber reinforced composite material which includes carbon fiber and a thermosetting resin composition and in which
  the thermosetting resin composition is a cured product of a liquid composition that contains unsaturated polyester, a curing agent, a polymerization initiator, and a nanocarbon/nanocellulose complex containing nanocarbon modified by a functional group and nanocellulose,
  a complex of graphene modified by the functional group and the nanocellulose is dispersed in the thermosetting resin composition,
  the thermosetting resin composition contains 0.05 to 15% by weight of the nanocarbon/nanocellulose complex, and
  a maximum point stress of the carbon fiber reinforced composite material in a tensile test according to JIS K 7164 is 410 N/mm$^2$ or more, and a maximum point stress of the carbon fiber reinforced composite material in a three-point bending test according to JIS K 7171 is 310 N/mm$^2$ or more.

(2) The carbon fiber reinforced composite material according to (1) which the nanocarbon is graphene.

Advantageous Effects of the Invention

According to the present invention, the carbon fiber reinforced composite material having excellent mechanical properties can be provided at low cost.

DESCRIPTION OF EMBODIMENTS

A carbon fiber reinforced composite material according to an embodiment of the present invention includes carbon fiber and a thermosetting resin composition. The thermosetting resin composition is a cured product of a liquid composition that contains unsaturated polyester, a curing agent, a polymerization initiator, and a graphene/nanocellulose complex (hereinafter, referred to as "nanocarbon/cellulose complex") containing nanocarbon modified by a functional group and nanocellulose. In the thermosetting resin composition, the nanocarbon/nanocellulose complex is dispersed. In the thermosetting resin composition, 0.05 to 15% by weight of the nanocarbon/nanocellulose complex is contained. In the carbon fiber reinforced composite material, a maximum point stress in a tensile test according to JIS K 7164 is 410 N/mm$^2$ or more, and a maximum point stress in a three-point bending test according to JIS K 7171 is 310 N/mm$^2$ or more.

Although the reason why the excellent mechanical strength is obtained as described above by combining carbon fiber and the cured product obtained by curing the liquid composition containing specific components in this manner may not be clear, for example, the reasons therefor may be that (i) adhesiveness between the carbon fiber and unsaturated polyester resin serving as matrix resin is enhanced, and (ii) the nanocarbon/nanocellulose complex is uniformly dispersed in the liquid composition, and, thus, a continuous nanocarbon/cellulose network structure is formed in the unsaturated polyester resin by interaction with the generated unsaturated polyester resin during reaction between the unsaturated polyester and a liquid curing agent. Furthermore, it is considered that, in addition to the mechanical strength being enhanced, breakage characteristics of the unsaturated polyester resin serving as the matrix resin is also improved by the action of (ii), to inhibit fragments from being scattered at the time of breakage.

The unsaturated polyester is a polymer compound that is obtained by polycondensation of polyalcohol and an acid component formed of α,β-unsaturated dibasic acid or an anhydride thereof, or polycondensation of polyalcohol, and an acid component formed of α,β-unsaturated dibasic acid or an anhydride thereof and a saturated dibasic acid or an anhydride thereof, and that has an unsaturated bond and an ester bond in a molecular main chain. The unsaturated polyester has low homopolymerizability, and is thus copolymerized with a curing agent, thereby obtaining cured resin. In the present invention, the cured resin is referred to as unsaturated polyester resin.

The α,β-unsaturated dibasic acid and the anhydride thereof are not particularly limited as long as they are generally used ones. Examples thereof include maleic acid, fumaric acid, itaconic acid, citraconic acid, HET acid, and acid anhydrides thereof. One of them may be used alone or a plurality of them may be used in combination.

The saturated dibasic acid and the anhydride thereof are not particularly limited as long as they are generally used ones. Examples thereof include phthalic acid, terephthalic acid, isophthalic acid, biphenyldicarboxylic acid, naphthalenedicarboxylic acid, 5-tert-butyl-1,3-benzenedicarboxylic acid, and acid anhydrides thereof. One of them may be used alone or a plurality of them may be used in combination.

The polyalcohol is not particularly limited as long as it is a generally used one. Examples thereof include ethylene glycol, 1,2-propanediol, 1,3-propanediol, 1,2-butanediol, 1,3-butane-diol, 1,4-butanediol, 2,3-butanediol, 1,4-butenediol, 2-methyl-1,3-propanediol, 1,5-pentanediol, neopentylglycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-hexanediol, 1,7-heptanediol, 1,8-octanediol, 1,9-nonanediol, 1,10-decanediol, 3-hydroxy-2,2-dimethylpropyl-3-hydroxy-2,2-dimethylpropanoate, diethylene triethylene glycol, dipropylene glycol, 2-methyl-1,4-butanediol, glycerin, 2,5-dihydroxymethylfuran, and an adduct of bisphenol A and alkylene oxide. One of them may be used alone or a plurality of them may be used in combination.

The unsaturated polyester may be synthesized by using a lower alkyl ester of saturated dibasic acid as necessary in addition to the above-described components. Such a lower alkyl ester is not particularly limited as long as it is a generally used one. Examples thereof include dimethyl phthalate, dimethyl terephthalate, dimethyl isophthalate, diethyl phthalate, diethyl terephthalate, diethyl isophthalate, dibutyl phthalate, dibutyl terephthalate, and dibutyl isophthalate.

The curing agent is not particularly limited as long as it is a generally used one. Examples thereof include styrene derivatives such as styrene, chlorostyrene, vinyltoluene, divinyltoluene, and p-methyl styrene methyl methacrylate, alkyl esters of methacrylic acid or acrylic acid, such as methyl methacrylate, ethyl methacrylate, ethyl acrylate, and butyl acrylate, hydroxyalkyl esters of methacrylic acid or acrylic acid, such as ethyl β-hydroxy methacrylate and ethyl β-hydroxy acrylate, and multifunctional methacrylic or acrylic esters, such as diallyl phthalate, diallyl isophthalate, triallyl isocyanurate, ethylene glycol dimethacrylate, neopentyl glycol dimethacrylate, and trimethylolpropane trimethacrylate. One of them may be used alone or a plurality of them may be used in combination. Among them, the styrene derivatives are preferable and styrene is particularly preferable.

The polymerization initiator is not particularly limited as long as it is a generally used one. Examples thereof include polymerization initiators using heat and polymerization initiators using energy rays. Examples of the polymerization initiator using heat include ketone peroxides such as methyl ethyl ketone peroxide and acetylacetone peroxide, diacyl peroxides such as benzoyl peroxide, peroxy esters such as t-butyl peroxybenzoate, hydroperoxides such as cumene hydroperoxide, and dialkyl peroxides such as dicumyl peroxide. Examples of the polymerization initiator using energy rays include benzophenones such as benzophenone, benzyl, and methyl ortho-benzoylbenzoate, benzoin ethers such as benzoin alkyl ethers, acetophenones such as benzyl dimethyl ketal, 2,2-diethoxyacetophenone, 2-hydroxy-2-methylpropiophenone, 4-isopropyl-2-hydroxy-2-methylpropiophenone, and 1,1-dichloroacetophenone, and thioxanthones such as 2-chlorothioxanthone, 2-methylthioxanthone, and 2-isopropylthioxanthone. One of them may be used alone or a plurality of them may be used in combination.

An amount of the polymerization initiator to be added can be determined as appropriate according to, for example, kinds of the unsaturated polyester, the curing agent, and the polymerization initiator. However, from the viewpoint of reducing residual reactive functional groups of the liquid curing agent and assuring good mechanical properties of the cured product, the amount of the polymerization initiator in the liquid composition is preferably 0.01 to 10% by weight, more preferably 0.05 to 5% by weight, and even more preferably 0.1 to 3% by weight.

An accelerator may be used in addition to the polymerization initiator in order to further accelerate reaction between the unsaturated polyester and the curing agent. Examples of such an accelerator include metal soaps such as cobalt naphthenate, cobalt octylate, zinc octylate, vanadium octylate, copper naphthenate, and barium naphthenate, metal chelates such as vanadium acetylacetate, cobalt acetylacetate, and iron acetylacetonate, aniline. N,N-substituted anilines such as N,N-dimethyl-p-toluidine. N,N-bis(2-hydroxyethyl)-p-toluidine, 4-(N,N-dimethylamino)benzaldehyde, 4-[N,N-bis(2-hydroxyethyl)amino]benzaldehyde, 4-(N-methyl-N-hydroxyethyl amino)benzaldehyde, N,N-bis(2-hydroxypropyl)-p-toluidine, N-ethyl-m-toluidine, triethanolamine, m-toluidine, diethylenetriamine, pyridine, phenylmorpholine, piperidine, N,N-bis(2-hydroxyethyl)aniline, and diethanolaniline, and amines such as N,N-substituted-p-toluidine and 4-(N,N-substituted amino)benzaldehyde. One of them may be used alone or a plurality of them may be used in combination.

The curable unsaturated polyester composition containing the unsaturated polyester and the curing agent may be a commercially available one. Examples of such a composition include SUNDHOMA5595(A)PT, 2915PT, FH-123-N, FR-123-W, FH-123-S, NR2907(A)PT, 2198(A)PT, LP-921-N, LP-924-N, FG-283, FG-387, and 668PT manufactured by DIC Material Inc., and U-Pica 4015, 4072, 4075, 4080, 4083, 4183, 4190, 4300, 4350, 4580, 5027, 5116, 5126, 22-34, and 22-44 manufactured by Japan U-Pica Company Ltd. One of them may be used alone or a plurality of them may be used in combination.

Examples of the nanocarbon used for the nanocarbon modified by a functional group include carbon nanotubes, fullerene, graphene, and mixtures thereof. Among them, graphene is preferable. Examples of the functional group modifying the nanocarbon include a functional group containing an oxygen atom. Examples of the functional group containing an oxygen atom include an epoxy group, a carboxy group, and a hydroxy group. Among the nanocarbon modified by such a functional group, graphene modified by a functional group is preferable and graphene oxide is particularly preferable since strength of the composite material is further enhanced.

As the graphene modified by a functional group, for example, the graphene described in the publication, "Mass production of graphene oxide from expanded graphite; Materials Letters, Volume 109, 15 Oct. 2013, Pages 207-210: Ling Sun, Bunshi Fugetsu", can be used. This will be briefly described below.

The graphene modified by a functional group includes graphene oxide modified by a functional group such as an epoxy group, a carboxy group, or a hydroxy group. The graphene is two-dimensional nanocarbon, and the average width thereof is about several hundreds of nm to several tens of μm and is preferably about 300 nm to 5 μm. Monolayer graphene and 2 to 10-layer graphene are preferable, and 2 to 5-layer graphene is more preferable.

Examples of the nanocellulose include nanocellulose obtained by introducing, into α-cellulose, a polar functional group having an affinity to the unsaturated polyester resin. Examples of such a functional group include hydrophilic functional groups. More specifically, the examples thereof include a hydroxy group, a carboxy group, a carbonyl group, and an amino group. Among them, a hydroxy group, a carboxy group, and a carbonyl group are preferable. In the carboxy group, a hydrogen ion may be substituted with a metal ion (this is referred to as metal salt of a carboxy group). Examples of the nanocellulose modified by such a functional group include TEMPO-catalyst-oxidized cellulose nanofiber (also referred to as TEMPO-oxidized nanocellulose). The TEMPO-catalyst-oxidized cellulose nanofiber is obtained by oxidizing pulp or the like with TEMPO catalyst and then performing a fining process on the obtained product, and, in the TEMPO-catalyst-oxidized cellulose nanofiber, carboxy groups or metal salt of carboxy groups are introduced in α cellulose. As the size of the nanocellulose, the average diameter is about 1 nm to 800 nm and the average length is about 100 nm to 1000 μm. Nanocellulose such as cellulose nanofiber and cellulose nanocrystal obtained by using a conventionally known method other than introduction of a polar functional group can also be used.

The nanocarbon/nanocellulose complex may further contain a crosslinking binder. Such a crosslinking binder may be a crosslinking binder that can enhance binding between nanocarbon modified by the functional group and nanocellulose. Examples thereof include higher alcohols, cellulose derivatives, lignin, amylose, and amylopectin. Among them, cellulose derivatives are particularly preferable. Such a crosslinking binder is more preferable when nanocellulose modified by a functional group is used.

The nanocarbon/nanocellulose complex can be formed by, for example, a step of spray-drying a mixture solution containing nanocarbon modified by the functional group and nanocellulose. Such a forming method using the spray-drying step is preferable in a case where graphene oxide and TEMPO-catalyst-oxidized cellulose nanofiber are used.

In the thermosetting resin composition, 0.05 to 15% by weight of the nanocarbon/nanocellulose complex is contained. Thus, it is considered that good adhesiveness between the carbon fiber and the thermosetting resin composition is obtained, and molecules in the unsaturated polyester resin form a uniform structure. In the thermosetting resin composition, 99.5 to 85% by weight of components derived from the unsaturated polyester and the liquid curing agent are preferably contained.

The thermosetting resin composition may contain additives other than the above-described components according to the usage or the like as long as dispersibility of the nanocarbon/nanocellulose complex and mechanical properties of the composite material are not affected. Examples of such an additive include a coloring agent such as a pigment, a plasticizer, a flame retardant, a stabilizer, an antistatic agent, an impact resistance enhancer, a foaming agent, an antibacterial/antifungal agent, a conductive filler, an anti-fogging agent, a cross-linking agent, and a solvent.

A carbon fiber that is generally used in a fiber-reinforced composite material can be adopted. Examples thereof include polyacrylonitrile (PAN)-based, pitch-based, and rayon-based carbon fibers. The form of the carbon fiber is not particularly limited. Examples thereof include twisted yarns, untwisted yarns, and twistless yarns. Untwisted yarns and twistless yarns are preferable from the viewpoint of balance between moldability and strength characteristics of the carbon fiber reinforced composite material. In a case where the carbon fiber is formed into a sheet-like shape, examples of the form of the carbon fiber include woven fabric, knitted fabric, and nonwoven fabric. The texture of the woven fabric is not particularly limited, and various weave textures can be adopted. Examples thereof include single weave, combination weave, pile weave, and lend weave. Examples of the single weave include three foundation weaves of plain weave, twill weave, and sateen weave, derivative weaves thereof, mixed weaves in which the three foundation weaves and the derivative weaves thereof are mixed, weaves other than the three foundation weaves and the derivative weaves thereof, and figured weave having patterns formed thereon. Examples of the combination weave include warp backed weave, weft backed weave, and double weave. Examples of the pile weave include velvet weave and towel weave. Examples of the leno weave include gauze weave and plain gauze weave. Examples of the knitted fabric include weft knit and warp knit. Examples of the weft knit include plain stitch, rib stitch, purl stitch, tuck stitch, float stich, lace stitch, pelerine stitch, interlock stitch, racked stich, and plated stiches. Examples of the warp knit include denbigh stitch, vandyke stitch, cord stitch, pillar stitch, tuck stitch, two needle stitch, double denbigh stitch, double atlas stitch, double cord stitch, half tricot stitch, satin stitch, sharkskin stitch, queen's cord stitch, pile stitch, pineapple stitch, inlay stitch, and milanese stitch. As the nonwoven fabric, for example, various types of nonwoven fabrics based on the terms specified in a) of JISL0222 can be adopted.

In the carbon fiber reinforced composite material, 10 to 60% by weight of the thermosetting resin composition is preferably contained and 40 to 50% by weight thereof is more preferably contained. Thus, a composite material having a good balance with the carbon fiber can be formed. In the carbon fiber reinforced composite material, 90 to 40% by weight of the carbon fiber is preferably contained and 60 to 50% by weight thereof is more preferably contained.

The carbon fiber reinforced composite material containing the carbon fiber and the thermosetting resin composition can be produced in a predetermined method. For example, a liquid composition containing the above-described unsaturated polyester, curing agent, polymerization initiator, and nanocarbon complex, and the additives to be added as necessary is prepared, and the liquid composition and the carbon fiber are used to combine the carbon fiber and the unsaturated polyester resin serving as matrix resin by using various conventionally known molding methods according to the purpose, thereby obtaining a molded product formed of the carbon fiber reinforced composite material. Examples of the molding method include a hand lay up method, a spray up method, a cold press method, a pultrusion molding method, a filament winding method, a rotational molding method, an SMC method, and a preform matched die method. Furthermore, a molded product formed of the carbon fiber reinforced composite material can also be obtained by impregnating sheet-shaped carbon fiber with the liquid composition to produce a prepreg, and then stacking, heating, and pressure-bonding a plurality of the prepregs. A conventionally known method can be adopted for the prepreg.

The liquid composition can be prepared by mixing the unsaturated polyester, the curing agent, the polymerization initiator, and the nanocarbon complex, and the additives to be added as necessary. The mixing order and time, a stirring manner, and the like are not limited as long as the nanocarbon complex can be uniformly dispersed.

As described above, the liquid composition as desired can be prepared simply by mixing and stirring predetermined components, and the liquid composition and typical carbon fiber are combined, whereby the carbon fiber reinforced composite material having excellent mechanical properties can be produced. Therefore, the production cost can be made low. In the carbon fiber reinforced composite material obtained as described above, the nanocarbon complex is uniformly dispersed in the matrix resin, and the molecular structure of the unsaturated polyester resin is uniform. Therefore, the carbon fiber reinforced composite material has excellent mechanical properties such that the maximum point stress in the tensile test according to JIS K 7164 is 410 N/mm$^2$ or more, and the maximum point stress in the three-point bending test according to JIS K 7171 is 310 N/mm$^2$ or more. Furthermore, fragments are inhibited from being scattered at the time of breakage. Thus, even if breakage occurs, reduction of the secondary damage due to the fragments can also be expected. Therefore, the present invention is applicable to various usages for aircrafts, automobiles (for example, vehicle bodies of electric automobiles), bicycles, ships, containers, robots, and the like.

The embodiment of the present invention will be described below based on examples.

EXAMPLES

Production Example 1

Graphene oxide was prepared in accordance with the description in the publication, "Mass production of graphene oxide from expanded graphite; Materials Letters, Volume 109, 15 Oct. 2013, Pages 207-210: Ling Sun, Bunshi Fugetsu". Colloid containing 0.3 wt % of TEMPO-oxidized nanocellulose and colloid containing 0.5 wt % of the graphene oxide were mixed at a ratio of 1:1 (volume), and were uniformly stirred, and a graphene/nanocellulose complex (nanocarbon complex) was then obtained by a spray drying processor.

Example 1

A liquid composition was obtained by mixing 99 parts by weight of an unsaturated polyester composition (SUNDHOMA FH-123-W manufactured by DIC Material Inc., containing styrene), 1 part by weight of the nanocarbon complex obtained in production example 1; and 1 part by weight of an initiator (Kayamek M manufactured by Kayaku Akzo Co., Ltd., methyl ethyl ketone peroxide), and dispersing the graphene/nanocellulose complex in liquid.

Six carbon fiber woven fabrics (manufactured by Taiwan Electric Insulator Co., Ltd., 3K yarn, plain weave, 200 g/m$^2$) were stacked while being impregnated with the obtained liquid composition, by a hand lay up method, and the unsaturated polyester was then cured to obtain unsaturated polyester resin, whereby a carbon fiber reinforced composite material formed of the carbon fiber and the unsaturated polyester resin composition was obtained. The carbon fiber reinforced composite material was obtained as a flat plate having a size of 300×250×2 mm. From this, a test piece for an evaluation test described below was obtained. A weight ratio (A/B) of the carbon fiber (A) to the unsaturated polyester resin composition (B) was 50/50.

Example 2

A carbon fiber reinforced composite material and a test piece thereof were obtained in the same manner as in Example 1 except that a liquid composition was obtained by mixing 97 parts by weight of an unsaturated polyester resin composition (SUNDHOMA FH-123-W manufactured by DIC Material Inc.), 3 parts by weight of the nanocarbon complex obtained in production example 1, and 1 part by weight of an initiator (Kayamek M manufactured by Kayaku Akzo Co., Ltd, methyl ethyl ketone peroxide) and dispersing the nanocarbon complex in liquid.

Comparative Example 1

A carbon-fiber-reinforced composite material and a test piece were obtained in the same manner as in example 1 except that 100 parts by weight of an unsaturated polyester resin composition (SUNDHOMA FH-123-W manufactured by DIC Material Inc.) and 1 part by weight of an initiator (Kayamek M manufactured by Kayaku Akzo Co., Ltd, methyl ethyl ketone peroxide) were mixed.

(Evaluation)
<Tensile Test>

A tensile test was performed in accordance with JIS K 7164 to calculate a maximum point stress. As a testing machine, AG-300kNXplus manufactured by SHIMADZU CORPORATION was used. The tensile rate was 2 mm/min and the temperature was 23° C. The test piece was a type 1B test piece according to JIS K 7164. The test was performed five times, and the average value was adopted as the maximum point stress [N mm$^2$] in the tensile test. The calculation results are indicated in Table 1.

<Three-Point Bending Test>

A three-point bending test was performed in accordance with JIS K 7171 to calculate a maximum point stress. As a testing machine, AG-I 100 kN manufactured by SHIMADZU CORPORATION was used. A distance between support points was 60 mm, the pressing rate was 5 mm/min, and the tip diameter of the pressing tool was 5 mm. A test piece was a rectangular test piece according to JIS K 7171. The test was performed five times, and the average value was adopted as the maximum point stress [N/mm$^2$] in the three-point bending test. The calculation results are indicated in Table 1.

TABLE 1

|  | Example 1 | Example 2 | Comparative example 1 |
|---|---|---|---|
| Tensile test [N/mm$^2$] | 460 | 479 | 381 |
| Three-point bending test [N/mm$^2$] | 342 | 430 | 273 |

Table 1 indicates that mechanical strength was enhanced by dispersing the nanocarbon complex in the unsaturated polyester resin composition. Furthermore, it was confirmed that fragments were not scattered in a broken state of the test pieces in the tensile test and the three-point bending test, in examples 1 and 2. Meanwhile, scattering of fragments were confirmed in comparative example 1.

The invention claimed is:

1. A carbon fiber reinforced composite material comprising:
   carbon fiber; and
   a thermosetting resin composition, wherein
   the thermosetting resin composition is a cured product of a liquid composition that contains unsaturated polyester, a curing agent, a polymerization initiator, and a nanocarbon/nanocellulose complex containing graphene oxide and nanocellulose,
   wherein the graphene oxide is modified by a functional group containing an oxygen atom and is used as it is for further enhancing strength of the composite material,
   the nanocarbon/nanocellulose complex is dispersed in the thermosetting resin composition,
   the thermosetting resin composition contains 0.05 to 15% by weight of the nanocarbon/nanocellulose complex, and
   a maximum point stress of the carbon fiber reinforced composite material in a tensile test according to JIS K 7164 is 410 N/mm$^2$ or more, and a maximum point stress of the carbon fiber reinforced composite material in a three-point bending test according to JIS K 7171 is 310 N/mm$^2$ or more.

2. The carbon fiber reinforced composite material according to claim 1, wherein
   the nanocarbon/nanocellulose complex is formed by spray-drying a mixture solution containing the graphene oxide and the nanocellulose.

3. The carbon fiber reinforced composite material according to claim 1, wherein
   the graphene oxide is modified by a functional group selected from an epoxy group, a carboxy group, and a hydroxy group.

4. The carbon fiber reinforced composite material according to claim 1, wherein
   the nanocellulose is obtained by introducing, into α-cellulose, a polar functional group having an affinity to an unsaturated polyester resin.

5. The carbon fiber reinforced composite material according to claim 1, wherein
   the nanocellulose is TEMPO-catalyst-oxidized cellulose nanofiber.

* * * * *